United States Patent
Goossens et al.

(10) Patent No.: US 7,969,899 B2
(45) Date of Patent: Jun. 28, 2011

(54) ELECTRONIC DEVICE, SYSTEM ON CHIP AND METHOD OF MONITORING DATA TRAFFIC

(75) Inventors: Kees G. W. Goossens, Eindhoven (NL); Calin Ciordas, Eindhoven (NL)

(73) Assignee: NXP B.V., Eindhoven (NL)

( * ) Notice: Subject to any disclaimer, the term of this patent is extended or adjusted under 35 U.S.C. 154(b) by 1 day.

(21) Appl. No.: 12/307,442

(22) PCT Filed: Jul. 3, 2007

(86) PCT No.: PCT/IB2007/052594
§ 371 (c)(1),
(2), (4) Date: Aug. 20, 2009

(87) PCT Pub. No.: WO2008/004187
PCT Pub. Date: Jan. 10, 2008

(65) Prior Publication Data
US 2010/0027421 A1    Feb. 4, 2010

(30) Foreign Application Priority Data
Jul. 5, 2006  (EP) ..................... 06116612

(51) Int. Cl.
*H04J 1/16* (2006.01)
(52) U.S. Cl. .................. 370/248; 370/400; 370/351
(58) Field of Classification Search ............... 370/400, 370/401, 402, 229, 231, 235, 236.2, 236.1, 370/248, 351
See application file for complete search history.

(56) References Cited

U.S. PATENT DOCUMENTS

| | | | |
|---|---|---|---|
| 6,513,060 B1 | 1/2003 | Nixon et al. | |
| 7,564,865 B2 * | 7/2009 | Radulescu | 370/458 |
| 7,684,335 B2 * | 3/2010 | Chen | 370/236 |
| 2005/0188276 A1 | 8/2005 | Hunter | |
| 2005/0223300 A1 | 10/2005 | Baartmans | |

FOREIGN PATENT DOCUMENTS

WO    2005109754 A1    11/2005

OTHER PUBLICATIONS

Ciordas, Calin, et al; "An Event-Based Network-On-Chip Monitoring Service", Proceedings, Int'l High-Level Design Validation and Test Workshop; Nov. 2004.
El Shobaki, Mohammed, et al; "A Hardware and Software Monitor for High-Level System-On-Chip Verification"; Malardalen Real-Time Research Centre; Department of Computer Engineering; Malardalen University, Vasteras, Sweden; IEEE 2001; pp. 56-61.

* cited by examiner

*Primary Examiner* — Brenda Pham (57) ABSTRACT

Therefore, an electronic device is provided which comprises a plurality of processing units (IP1-IP6), and a network-based interconnect (N) coupling the processing units (IP1-IP6) for enabling at least one first communication path (C) between the processing units (IP1-IP6). The electronic device furthermore comprises at least one first monitoring unit (P1) for monitoring a data traffic of the at least one first communication path and for outputting monitoring results via at least one second communication path (MC1), and at least one second monitoring unit (P2) for monitoring a data traffic of the at least one second communication path (C) and for outputting monitoring results via at least one third communication path (MC2).

15 Claims, 8 Drawing Sheets

ELECTRONIC DEVICE, SYSTEM ON CHIP AND METHOD OF MONITORING DATA TRAFFIC

FIELD OF THE INVENTION

The present invention relates to an electronic device, a system on chip and a method of monitoring data traffic.

BACKGROUND OF THE INVENTION

Networks on chip NOC proved to be scalable interconnect structures in particular for systems on chip which could become possible solutions for future on chip interconnections between so-called IP blocks, i.e. intellectual property blocks. IP blocks are usually modules on chip with a specific function like CPUs, memories, digital signal processors or the like. The IP blocks communicate with each other via the network on chip. The network on chip is typically composed of network interfaces and routers. The network interfaces serve to provide an interface between the IP block and the network on chip, i.e. they translate the information from the IP block to information which the network on chip can understand and vice versa. The routers serve to transport data from one network interface to another. For best effort communication, there is no guarantee regarding the latency of the throughput of the communication. For guaranteed throughput services, an exact value for the latency and throughput is required. In addition, fewer or more communication classes may be present in the network, and be used by the monitoring system.

The communication within a network on chip NOC is typically packet-based, i.e. the packets are forwarded between the routers or between routers and network interfaces. A packet typically consists of a header and payload.

To monitor the data traffic via the network on chip, debug probes can be attached to components of the network on chip, i.e. routers and network interfaces, and may allow a debugging of data to be generated on-chip. The probes can be organized in a monitoring system. A sniffer probe allows (non-intrusive) access to functional data from a network link and/or a NoC component. Sniffer probes can be arranged such that they are able to sniff from a connection passing that link. Sniffing is at least part of the data traffic required for debugging and constitutes a requirement for other debug-related components like analyzers or event-generators and data/event-filters. Data generated by sniffers is sent towards the monitoring service access point (MSA) via a debug connection. The monitoring service access point constitutes a centralized access point for the monitoring data. Monitoring service access points MSAs may be present in the system, and they may located on the system on chip SOC (same or different die), or different (companion) chips (such as FPGA), or even on debugging or prototyping equipment (including PCs that are linked up with the SOC). In order to sniff the whole traffic from a connection, the bandwidth required for the debug connection will correspond to more or a less to the bandwidth of the sniffed connection.

The sniffing or monitoring probes may be used as a prerequisite of hardware, software or system level debugging or may be provided for a run-time performance analysis. In "An event-based network-on-chip monitoring service" by Ciordas et al., in Proc. Int'l High-Level Design Validation and Test Workshop (HLDVT), November 2004, a generic modular probe has been described. A sniffer is used to monitor the data of a network link and to forward its output data to a monitoring service access point. The monitoring probe typically comprises a sniffer, an event generator and a monitoring network interface. Such a probe can be attached to a router or a network interface. The event generator is used to generate a time-stamped event based on the data from the sniffer. The monitoring network interface is used packetize the data from the event generator and the data is sent via the network-on-chip to the centralized monitoring service access point.

Typically, such monitor may involve a lot of local processing. The required data is sniffed locally, through the generic sniffer, e.g. from the router where the monitor is attached. Other data passing other network on chip elements may be outside the reach of such a monitor. Therefore, if not all the routers probed many cases may occur where monitoring is not possible. However, if the number of monitors are reduced the monitoring visibility on the system may also be reduced.

SUMMARY OF THE INVENTION

It is therefore an object of the invention to provide an electronic device and a method for monitoring a data traffic which enables a more effective and more flexible monitoring of the data traffic.

This object is solved by an electronic device according to claim 1, a system on chip according to claim 6 and method for monitoring data traffic according to claim 7.

Therefore, an electronic device is provided which comprises a plurality of processing units, and a network-based interconnect coupling the processing units for enabling at least one first communication path between the processing units. The electronic device furthermore comprises at least one first monitoring unit for monitoring a data traffic of the at least one first communication path and for outputting monitoring results via at least one second communication path, and at least one second monitoring unit for monitoring a data traffic of the at least one second communication and for outputting monitoring results via at least one third communication path.

Accordingly, a first monitor is provided to monitor the data traffic from a user communication path while a second probe is provided to monitor the output of the first monitor such that a distributed monitoring can be achieved at reduced (hardware) cost.

In a further aspect of the present invention the first monitoring unit comprises at least one filter unit for filtering a data traffic of the first communication path between processing units, and/or the second monitoring unit comprises at least one filter unit for filtering the data traffic of the second communication path (claim 2). The monitoring of the data traffic of a user communication path can be divided into separate monitoring tasks which may be distributed within the interconnect, wherein each monitor unit may perform a part of the monitoring and filtering.

In a further aspect of the present invention the electronic device comprises a sink unit for deleting data of the second and/or third communication path (claim 3). By means of the sink unit data traffic from the user communication path or from the monitoring communication path can be deleted if required e.g. if the data traffic from the monitoring communication paths is only required a certain points in the interconnect.

In still a further aspect of the present invention the electronic device furthermore comprises a network interface associated to at least one of the plurality of processing units. The network-based interconnect comprises a plurality of routers. The sink unit is embodied in the network interface, in a processing unit, as an independent processing unit and/or on a link between two routers or a link between a router and a network interface (claim 4).

In a further aspect of the present invention flow control data is provided along the second communication path in an opposite direction of the data traffic of the first communication path. The sink unit is adapted to provide flow control data for the deleted data of the first, second and/or third communication path (claim 5). Therefore, if the sink unit deletes data it will supply the necessary flow control data.

The present invention also relates to a system on chip, which comprises a plurality of processing units, and a network-based interconnect coupling the processing units for enabling at least one first communication path between the processing units. The system on chip furthermore comprises at least one first monitoring unit for monitoring a data traffic of the at least one first communication path and for outputting monitoring results via at least one second communication path, and at least one second monitoring unit for monitoring a data traffic of the at least one second communication and for outputting monitoring results via at least one third communication path.

The present invention also relates to a method for monitoring data traffic in an electronic device having a plurality of processing units, and a network-based interconnect coupling the processing units for enabling at least one first communication path between the processing units. A data traffic of the at least one first communication path is monitored. The monitoring results are outputted via at least one second communication path. A data traffic of the at least one second communication is monitored; and monitoring results are outputted via at least one third communication path.

The advantages of the invention is that only a smaller number of sophisticated probes are required as data (raw or preprocessed) can be forwarded to the probe (which may be potentially spatially-distant, complex, area expensive probe) by other monitors (which may be simpler, have a smaller area, and are spatially distributed). Furthermore, an area efficient monitoring is achieved.

The invention relates to the idea that instead of having a coverage with N complex probes, the same coverage may be reached with a few complex probes C together with less complex probes L able to do at least sniffing, where N may correspond to C+L. Accordingly, the data locality problem for complex monitoring probes with high abstraction power is dealt with. This may be performed by exploiting the spatial distribution of the monitoring probes, differentiated run-time capabilities (abstraction and filtering) of the monitoring probes, and the usage of an interconnect which allows the run-time setup of a connection on a desired path. This enables a trade-off between the number of monitors in the system and the bandwidth used by the monitors to forward data between themselves and the MSA.

BRIEF DESCRIPTION OF EMBODIMENTS

The advantages and embodiments of the present invention are now described in more detail with reference to the drawings.

Figure 1:
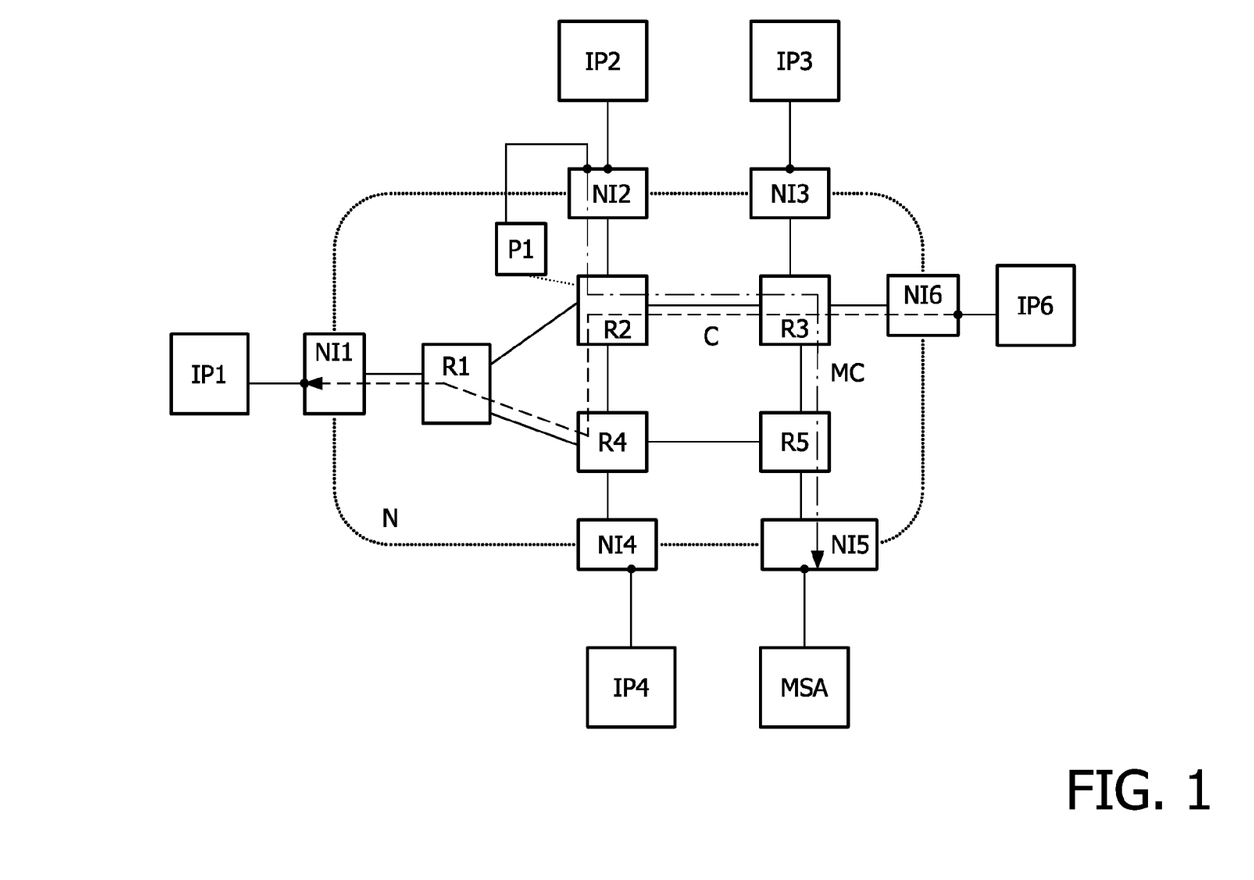
FIG. 1 shows a basic structure of a system on chip (or an electronic device) with a network on chip interconnect according to the invention.

FIG. 1 shows a basic structure of a system on chip (or an electronic device) with a network on chip interconnect according to the invention. A plurality of IP blocks IP1-IP6 are coupled to each other via a network on chip N. The network N comprises network interfaces NI for providing an interface between the IP block IP and the network on chip N. The network on chip N furthermore comprises a plurality of routers R1-R5. The network interface NI1-NI6 serves to translate the information from the IP block to a protocol, which can be handled by the network on chip N and vice versa. The routers R serve to transport the data from one network interface NI to another. The communication between the network interfaces NI will not only depend on the number of routers R in between them, but also on the topology of the routers R. The routers R may be fully connected, connected in a 2D mesh, connected in a linear array, connected in a torus, connected in a folded torus, connected in a binary tree, in a fat-tree fashion, in a custom or irregular topology. The IP block IP can be implemented as modules on chip with a specific or dedicated function such as CPU, memory, digital signal processors or the like. Furthermore, a user connection C or a user communication path with a bandwidth of e.g. 100 MB/s between NI6 and NI1 serving for the communication of IP6 with IP1 is shown. A monitoring service access unit is provided as an IP block and as a central access point for monitoring the data.

The information from the IP block IP that is transferred via the network on chip N will be translated at the network interface NI into packets with possibly variable length. The information from the IP block IP will typically comprise a command followed by an address and an actual data to be transported over the network N. The network interface NI will divide the information from the IP block IP into pieces called packets and will add a packet header to each of the packets. Such a packet header comprises extra information that allows the transmission of the data over the network (e.g. destination address or routing path, and flow control information). Accordingly, each packet is divided into flits (flow control digit), which can travel through the network on chip. The flit can be seen as the smallest granularity at which control is taken place. An end-to-end flow control may be used to ensure that data is not sent unless there is sufficient space available in the destination buffer.

In addition a probe or monitor P1 which is attached or coupled to the router R2 is provided in order to sniff or monitor a data flow through the router R2. The output of the probe P1 is coupled to the network interface NI2. The probe is able to sniff data like flits, messages, transactions or other granularity depending how much intelligence is built in the probe. Here, as an example the probe can sniff flits, i.e. the probe P1 is able to sniff all flits of the connection C when the flits pass the router R2. The sniffed flits are passed to the network interface NI2 and is forwarded to the monitoring service access unit MSA via a debug or monitor connection MC (or a debug communication path) from the second network interface NI2 to monitoring service access unit MSA to transport the data of the probe, i.e. the monitoring or debug data. The bandwidth BD of the debug connection MC1 is bandwidth B+a packetization overhead added by the network interface NI2, i.e. the band width BD is at least of bandwidth B, e.g. BD=120 MB/s. Probes or monitors may be attached to any components of the system on chip SOC component, including routers, network interfaces, links, interfaces and internal parts of IP blocks, memories and their interfaces, dedicated links between IP blocks (bypassing the network), and at like.

Although a router link, for example for Etheral routers, may offer a raw bandwidth of 2 GB/link/s, part of this bandwidth may be already used by the existing mapping of user connections on the network on chip N. If the links (NI2-R2) and (R3-R5) can only allow a lower bandwidth connection than the bandwidth BD, e.g. 70 MB/s, as the rest is in use due to the existing mapping of user connections on the network on chip NoC, the sniffing cannot be performed, as the bandwidth BD cannot be offered by the network on chip N on any single route from the network interface NI2 to network interface NI5 (NI5 connects the MSA where the sniffed data must go).

The communication between the IP blocks can be based on a connection or can be a connection-less communication (i.e. a non-broadcast communication, e.g. a multi-layer bus, AXI bus, AHB bus, a switched-based bus, multi-chip interconnects, multi-chip hop interconnects). The network may include a collection (hierarchically arranged or otherwise) of sub-networks or sub-interconnect structures, it may span over multiple dies (e.g. in a system in package) or over multiple chips (including multiple ASICs, ASSPs, and FPGAs). Moreover, if the system is being prototyped, the network may connect dies, chips (including especially FPGAs), and computers (PCs) that run prototyping & debugging software, the monitoring service access point MSA, or functional parts of the system. The interconnect for debugging data is preferably the same as the interconnect for functional data. It may, however, also be a (partially) different interconnect (e.g. a lower speed token, ring, bus or network).

Figure 2:
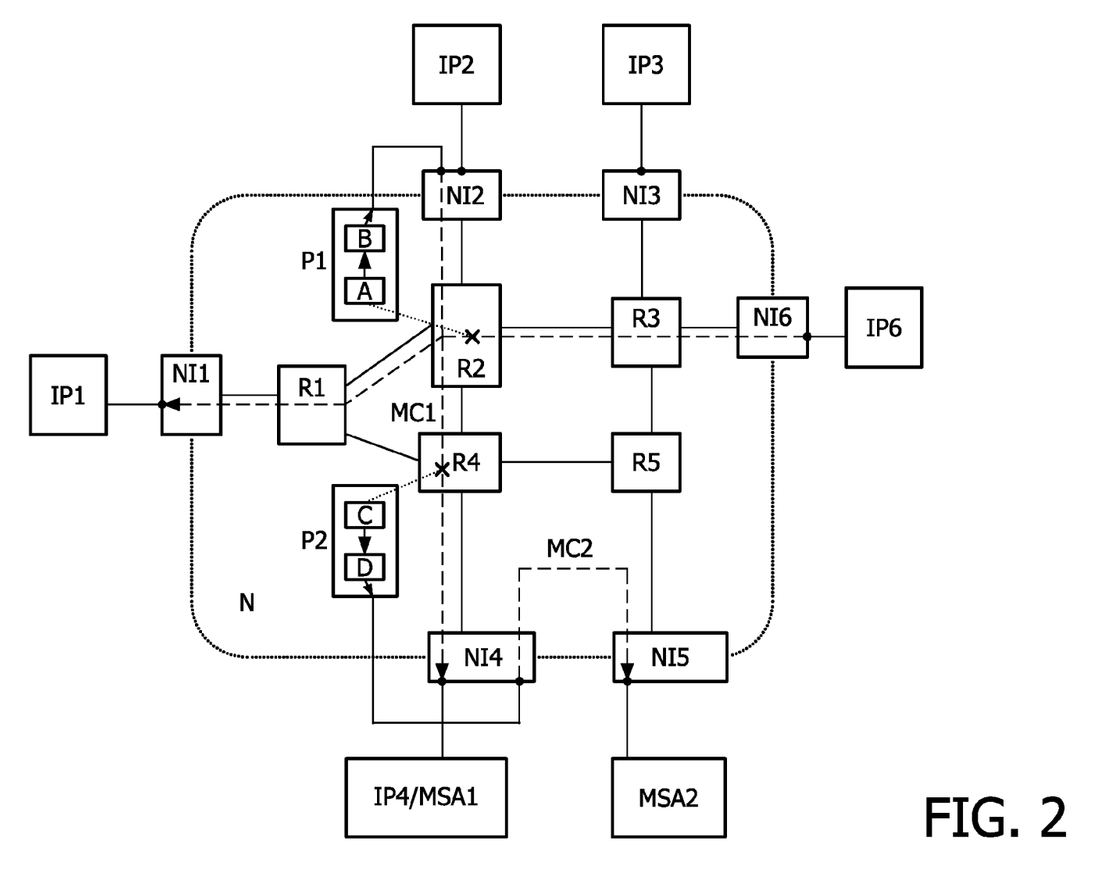
FIG. 2 shows a block diagram of a system on chip according to a first embodiment.

FIG. 2 shows a basic structure of a system on chip (or an electronic device) with a network on chip interconnect according to a first embodiment. The system on chip according to FIG. 2 substantially correspond to the system on chip according to FIG. 1. The IP block IP4 is implemented as a first monitoring service access unit MSA1, which is provided as a central access point for monitoring the data. The IP block IP4 is coupled to the network interface NI4. Furthermore, a second monitoring service access unit MSA2 is provided which is coupled to the network interface NI5. As in FIG. 1 a first probe P1 is coupled to the router R2 for monitoring and sniffing the data traffic through the router R2. The output of the first probe P1 is forwarded to the network interface NI2 such that this data can be transferred as a first debug or monitor connection MC1 via the network on chip and via the network interface NI4 to the first monitoring service access unit MSA1. A second probe P2 is coupled to the router R4 for monitoring and sniffing the data traffic through the router R4. The output of the second probe P2 is forwarded to the network interface NI4 such that this data can be transferred as a second debug or monitor connection MC2 via the network on chip and via the network interface NI5 to the second monitoring service access unit MSA2. Each of the probes or monitors P1, P2 can intercept any data passing their associated routers The first probe or monitor P1 may comprise a first and second filter A, B, wherein the first filter A filters the data as sniffed from the router R2 (the data from the connection C) and the second filter B can filter the output of the first filter A. The output of the second filter B is then forwarded to the second network interface NI2 and to the network interface NI4 as a debug or monitor connection MC1. The second probe or monitor P2 can comprise a third and fourth filter C, D, wherein the third filter C filters the data as sniffed from the router R4 (i.e. the debug or monitor connection MC1) and the fourth filter D can filer the output of the third filter C. The output of the second filter D is forwarded to the network interface NI4.

For example if two different functions or objectives are of interest, namely f(X) and g(f(X)), which relate to the particular user connection or a communication path, each function f and g can be a sequence of local filters A-D or abstractors e.g. f(X)=B(A(X)) and g(f(X))=D(C(f(X))=D(C(B(A(X)))). As mentioned above the components or filters A and B are locally implemented in probe P1, and the filters C and D are locally implemented in probe P2. However, only the first probe P1 can actually access the path of the user connection, i.e. the data X from the user connection data can only be sniffed once by the first probe or monitor P1. Therefore, the function f(X) is determined locally by the first and second filter A, B of the first probe P1, and results thereof are send toward the monitoring service access unit MSA1 via the monitoring connection MC1. The monitoring connection MC1 extending from the network interface NI2 to monitoring service access unit MSA1 is set up such that the second monitoring probe P2 is on the path of monitoring connection MC1.

As shown in FIG. 2, it is not possible directly compute to the function g at the probe P1 or at the probe P2. However, as the second probe P2 is arranged in the path of the monitoring connection MC1, the function g can be computed based on the results from the first probe P1. Therefore, the second probe P2 sniffs the data from the first debug or monitoring connection MC1, which is in fact the f(X) being packetized by the network interface NI2. The second probe P2 depacketizes the data f(X), i.e. it removes the header if the data traffic for connection MCI is a streaming traffic. The second probe P2 then computes the second function g(f(X)) by means of the third and fourth filter C, D. Its data is output towards the second monitoring service access unit MSA2 via monitoring connection or communication path MC2, from the network interface NI4 to the network interface NI5.

Although in the above two separate monitoring service access unit have been described, the two monitoring service access unit MSA1 and MSA2 may be the same or different MSAs (also with different numbers). The above described principles of the invention can be applied to a chain of n probes and m monitoring service access unit MSAs. Furthermore, r probes sniffing one monitoring connection with data f(X) performing different function $f_1(f(X)) \ldots f_r(f(X))$ may be provided.

Figure 3:
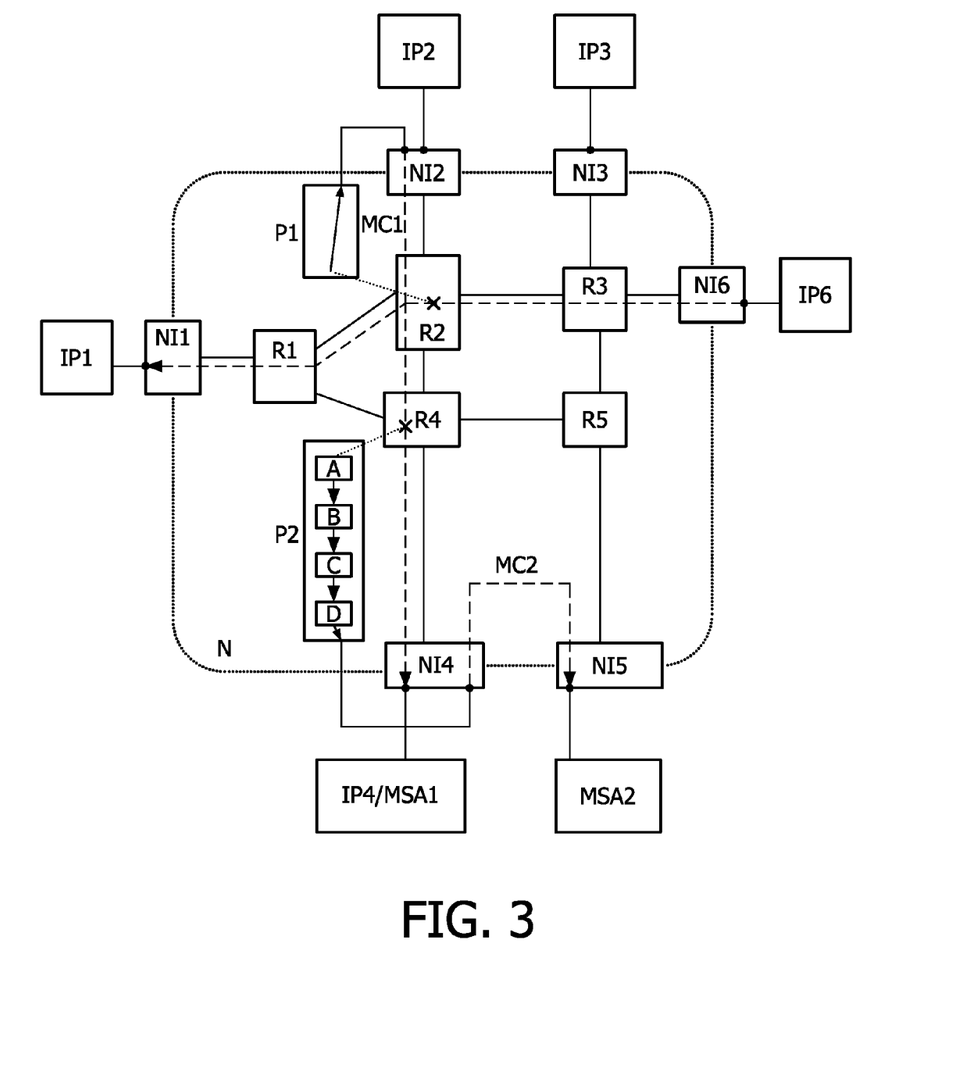
FIG. 3 shows a block diagram of a system on chip according to a second embodiment.

FIG. 3 shows a block diagram of a system on chip with a network-on-chip interconnect according to a second embodiment. The system on chip according to FIG. 3 substantially corresponds to the system on chip as shown in FIG. 2.

If only a single objective f(X)=D(C(B(A(X)))) is of interest (i.e. subsequent filters A, B, C, and D) at the second monitoring service access unit MSA2, wherein X corresponds to the data traffic on the user connection C, the function f cannot be computed at the first probe P1. Although, the second probe P2 is able to compute the objective it has no direct access to the user connection C. This can be solved as the first probe P1 can sniff the connection data traffic X and send it through the monitoring connection or communication path MC1 to the network interface NI4, which forwards the packetized data to the router R4 where the second probe P2 is located. Although the filtering and abstraction units (A-D) are depicted as part of the second probe P2, they may also be distributed over the first probe P1 and second probe P2 (e.g. A at P1 and B-D at P2).

As the second probe P2 sniffs or monitors the data from the first debug connection MC1, which corresponds to the packetized data X, the second probe P2 depacketizes X and locally computes the objective f(X), i.e. by means of the filters. The data obtained is sent toward the second monitoring service access unit MSA2 via a monitoring connection MC2 from the network interface NI4 to the network interface NI5.

The required objective of interest may be provided by a combination of filtering at P1 and P2, e.g. all filtering at P2 and none at P1 (described above), or partially P1 and partially at P2. A combination of the multiple objective (FIG. 2) and single objective (FIG. 3) are possible also.

Figure 4:
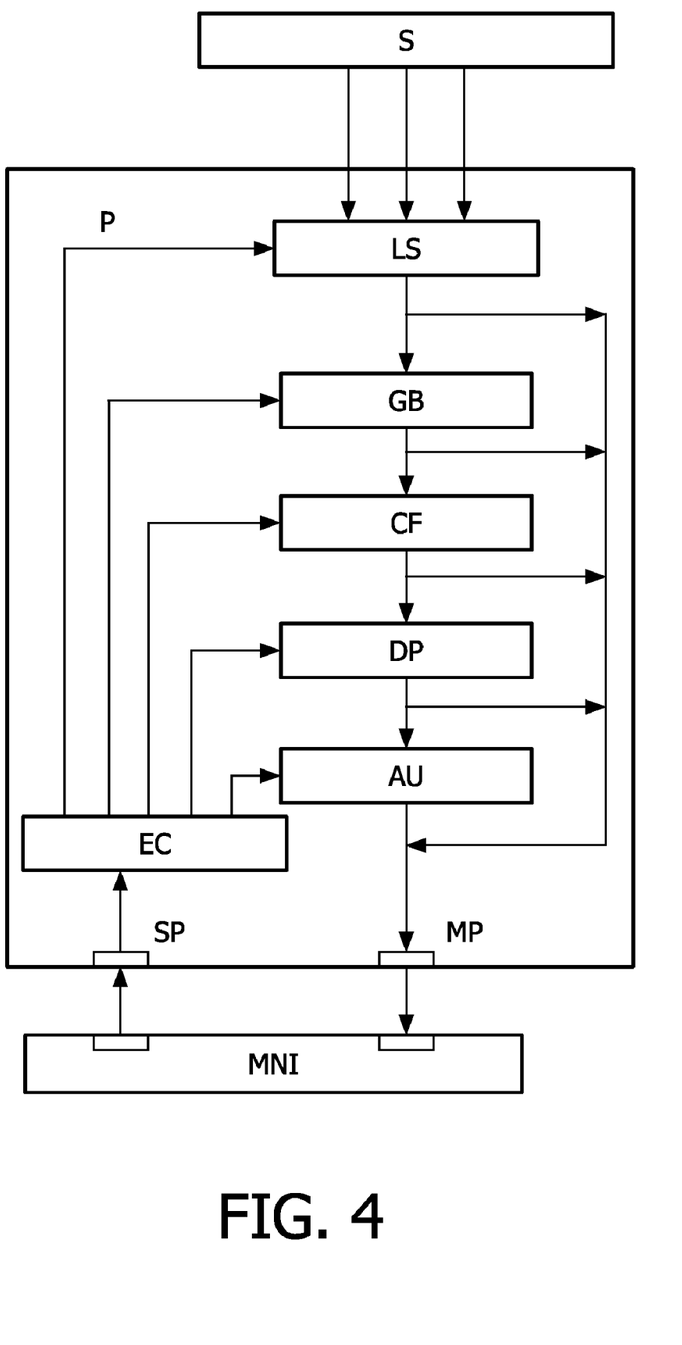
FIG. 4 shows a block diagram of a detailed monitoring unit according to a third embodiment.

FIG. 4 shows a block diagram of a detailed monitoring unit according to a third embodiment. The monitoring unit or the transaction monitor can be coupled to a router via a sniffer S. The sniffer will forward the data traffic which passes the associated router to the monitoring unit M. The monitoring unit can be coupled to a network interface MNI via which the monitoring unit can be coupled to the network for forwarding the results of the monitoring unit. The monitoring unit may have several blocks which are used to filter the raw data from the sniffer. Preferably, these filtering blocks are coupled in series such that they filter the output of the preceding block. The network interface MNI of the monitoring unit can be implemented as a separate network interface or can be merged with existing network interfaces.

The monitoring unit can sniff all router links. The link selection unit LS will select at least one link which is to be further analyzed. An enable/configuration unit EC can be provided for enabling and configuring the monitoring unit. The monitoring unit may have two ports, namely a slave port SP through which the monitoring unit can be programmed. The second port can be implemented as a master port MP for sending the result of the monitoring to a monitoring service access point MSA via the network interface.

The link selection unit LS serves to filter the data traffic from the selected link, in particular all flits passing on the selected links are forwarded to the next filtering block. By filtering the data from the sniffer, the amount of data traffic which is to be processed by the next filtering block is reduced. In the next filtering block GB, the guaranteed throughput GT or best effort BE traffic can be filtered which will also lead to a reduction of the data traffic which still needs to be monitored and processed. The connection filtering unit CF identifies at least one selected connection for example by means of the queue identifier and the path which may uniquely identify each connection. If destination routing is used, the connection can be filtered based on the destination address (and the connection queue identifier if this is not part of the destination identifier).

Other embodiments achieving the same purpose are also possible. This can for example be programmed by the slave port SP. As the queue identifier and the path can be part of the header of the packets, this can easily be identified by the connection filtering unit CF. To identify the messages which are part of the data traffic, the packets of the selected connection need to be depacketized such that the payload thereof can be examined for any relevant messages. This is preferably performed in the depacketization unit DP. The result of this depacketization can be forwarded to an abstraction unit AU where the messages are monitored and examined to determine whether an event has taken place. The DP and AU units may be combined or separate depending on the (in)dependence of the transport and network protocols and their encoding in the packet & message headers. The respective event can be programmed by the slave port SP and the enable/configuration block.

It should be noted that although according to the third embodiment it has been described that the filtering blocks are part of a single monitoring unit, these filtering blocks may be distributed among several monitoring units in the network on chip.

According to a further embodiment which can be based on the first, second or third embodiment the monitors or probes P1, P2 are not only adapted to monitor or sniff a data traffic from one connection, but they are adapted to sniff or monitor a data traffic from at least two connections. For example, one monitor P1, P2 can sniff or monitor part of each of the two connections, while the other monitor may sniff or monitor the rest of the connection. Accordingly, the data traffic to be monitored from one or more connections may be monitored by a single monitor or by a plurality of monitors, wherein the plurality of monitors may perform a distributed monitoring, for example by each monitor monitoring part of the connection or by monitoring part of several connections.

The above described probes P1 and P2 always forward the data that was monitored. However, this may not be desirable as data is sent to both monitoring service access units MSA1, MSA2. Therefore, a destructive sniffing/monitoring deleting the original data that is monitored may be provided e.g. as a maximal filter. Accordingly, the data is not forwarded to monitoring service access unit MSA1. Alternatively, the original data can be routed by the network on chip NOC to an IP block that deletes the data. However, this is less desirable as bandwidth as well as power is wasted. This will now be described in more detail.

Figure 5:
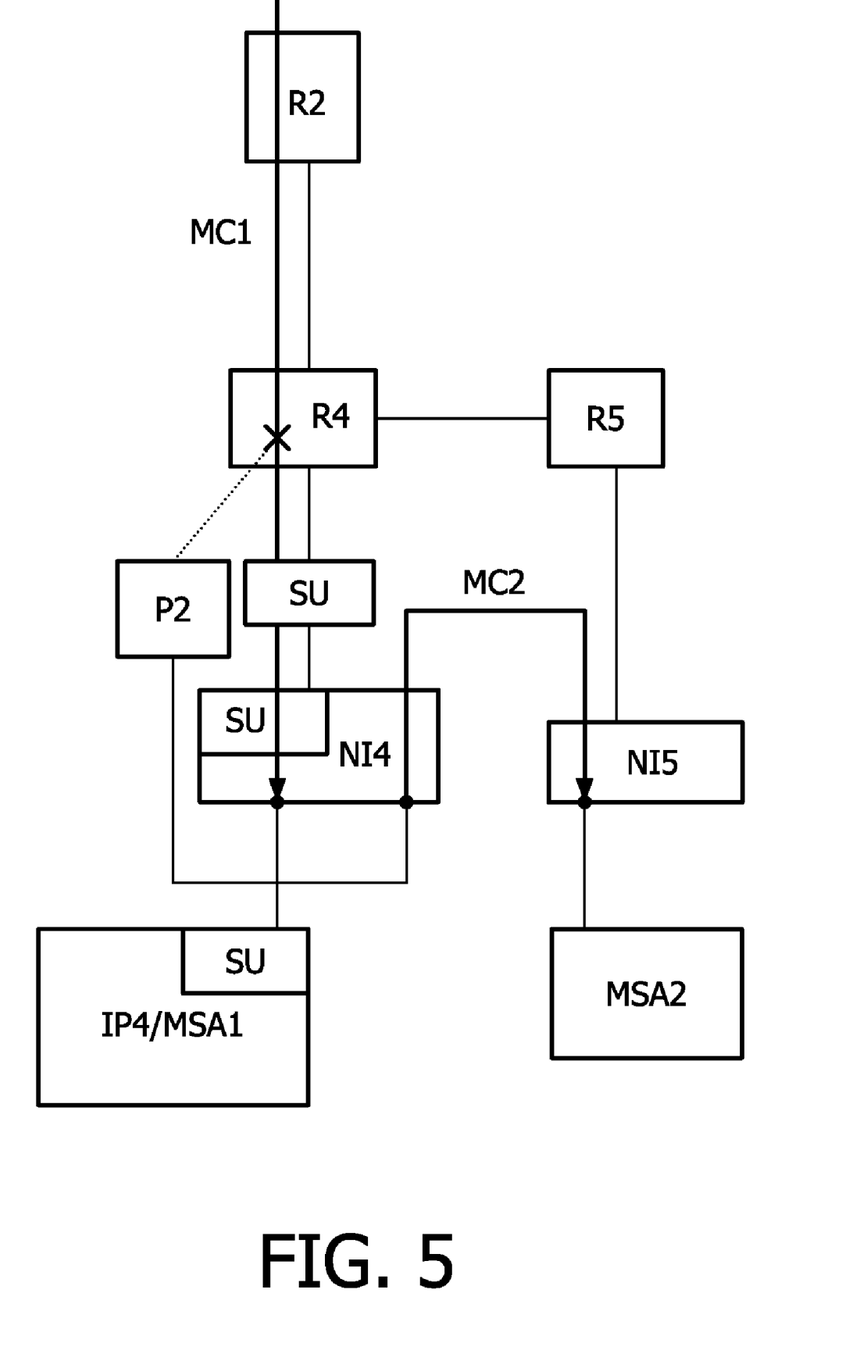
FIG. 5 shows a block diagram of part of the system on chip according to FIG. 2 according to a fourth embodiment.

FIG. 5 shows a block diagram of part of the system on chip according to FIG. 2 according to a fourth embodiment. A sink unit SU is provided and can be implemented as a separate module and serves to delete data of the user connection C, UC2 and/or of the monitoring connections MC1, MC2. The sink unit SU can be arranged between the router R4 and the network interface NI4, it can be integrated into the network interface NI4 and/or into the monitoring service access unit MSA1. In other words the sink unit SU can be embodied into an existing IP block (by merging it into the IP block) or as an additional IP block. If the sink unit SU is embodied as an additional IP block next to a monitoring service access unit MSA then preferably the sink unit and the monitoring service access unit MSA are coupled to the same network interface. If the sink unit SU is embodied in a network interface then it is merged with the architecture of the existing network interface.

Figure 6:
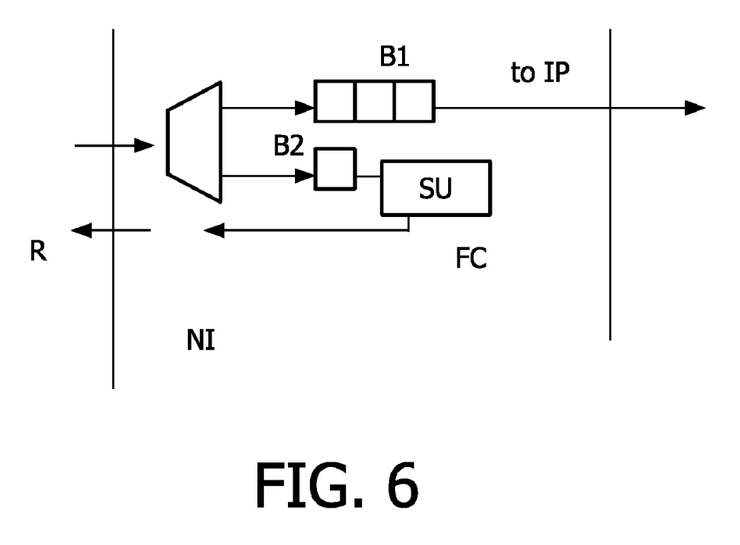
FIG. 6 show a block diagram of a network interface according to a fifth embodiment.

FIG. 6 show a block diagram of a network interface according to a fifth embodiment. Here, the sink unit SU is embodied in the network interface NI. The network interface comprises a de-multiplexer DEMUX, a first and second buffer B1, B2 coupled to the output of the de-multiplexer DEMUX and a sink unit SU coupled to the output of the second buffer B2. Preferably, the sink unit SU is merged with any existing end-to-end flow control FC which is required for the monitoring connection MC1 (e.g. GT and BE traffic) and/or the flow control of the user connection.

Figure 7:
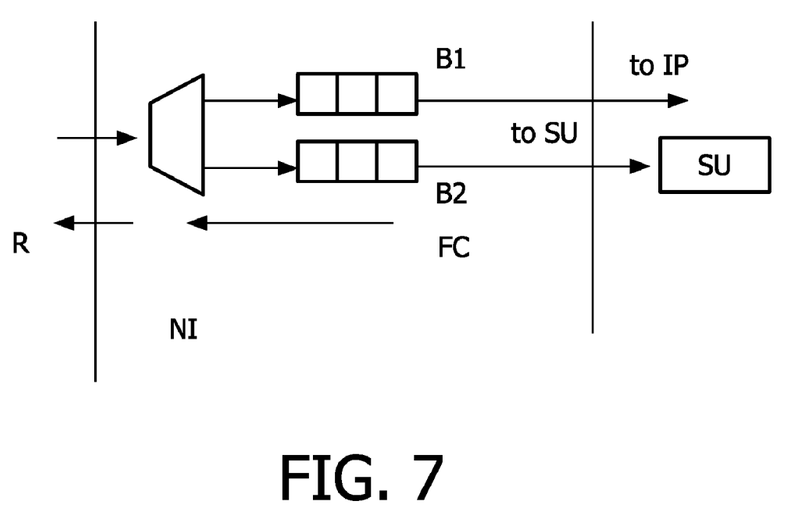
FIG. 7 shows a block diagram of part of the system on chip of FIG. 2 according to a sixth embodiment.

FIG. 7 shows a block diagram of part of the system on chip of FIG. 2 according to a sixth embodiment. Here, the sink unit SU is embodied in or as the IP block. The network interface NI comprises a de-multiplexer DEMUX, and a first and second buffer B1, B2 coupled to the output of the de-multiplexer DEMUX. The output of the first buffer B1 is coupled to the IP block IP and the output of the second buffer SU is coupled to the sink unit SU (which may be part of the IP block or which may be implemented as a separate IP block). The sink unit SU serves to delete data from the monitoring connections and/or from the user connections. Preferably, the complete data from the monitoring and/or user connections are deleted. This may be set at the design of the system, at the set-up of a user connection or during run-time (e.g. depending on the data traffic in the system).

Figure 8A:
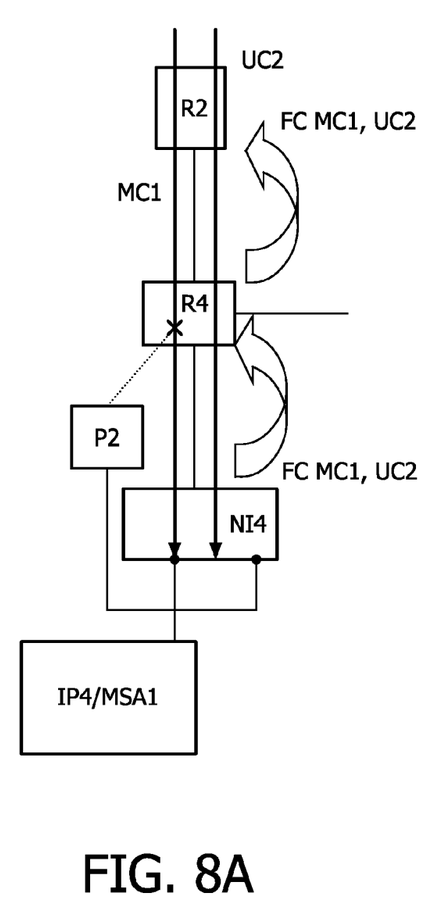
FIG. 8A shows a block diagram of part of a system on chip and FIG. 8B shows a block diagram of the system on chip of FIG. 8A with a sink unit according to an seventh embodiment.
Figure 8B:
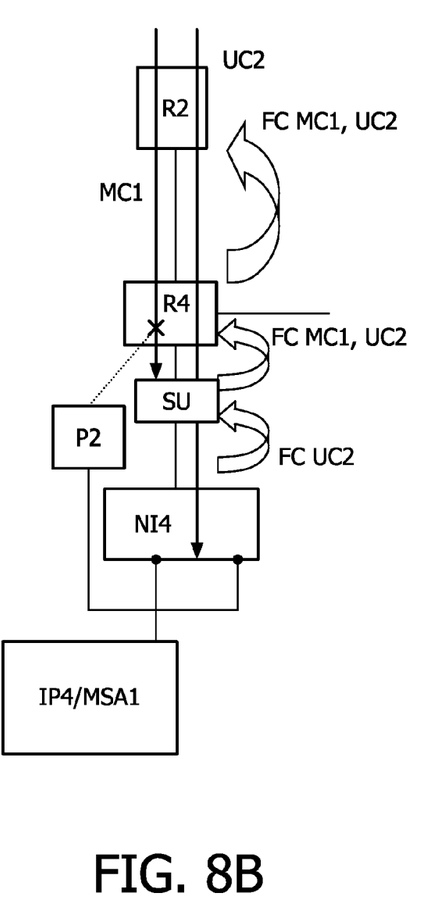

FIG. 8A shows a block diagram of part of a system on chip and FIG. 8B shows a block diagram of the system on chip of FIG. 8A with a sink unit according to a seventh embodiment. In FIG. 8A, a user connection UC2 and a monitoring connection MC1 are depicted which extend from the router R2 to the router R4 and to the network interface NI4. Therefore, corresponding flow control data FCUC2, FCMC1 must travel from the network interface NI4 to the router R4 and to the router R2, i.e. the flow control data travel in the opposite direction as the data traffic in the monitoring and user connection. In FIG. 8B the sink unit SU is implemented in or on a (router) link. This link may be a link between two routers or between a router and a network interface. As the data traffic from the monitor connection MC1 travels from router R2 to router R4 and to network interface NI4, the flow control FC data travels in the opposite direction (if link-level flow control is used). However, if the sink unit SU is implemented on the link and deletes data then the link level flow control must be dealt with. In FIG. 8B a flow control FCUC2 for the user connection UC2 is forwarded from the network interface NI4 to the sink unit SU. The sink unit SU must supply the flow control data FCMC1 of the deleted data of the monitoring connection MC1 to the flow control for the user connection because the traffic is deleted and will not reach the network interface NI4 which in would otherwise have supplied the link-level flow control.

The communication between the IP blocks can be based on a connection or can be a connection-less communication (i.e. a non-broadcast communication, e.g. a multi-layer bus, AXI bus, AHB bus, a switched-based bus, multi-chip interconnects, multi-chip hob interconnects.

Figure 9:
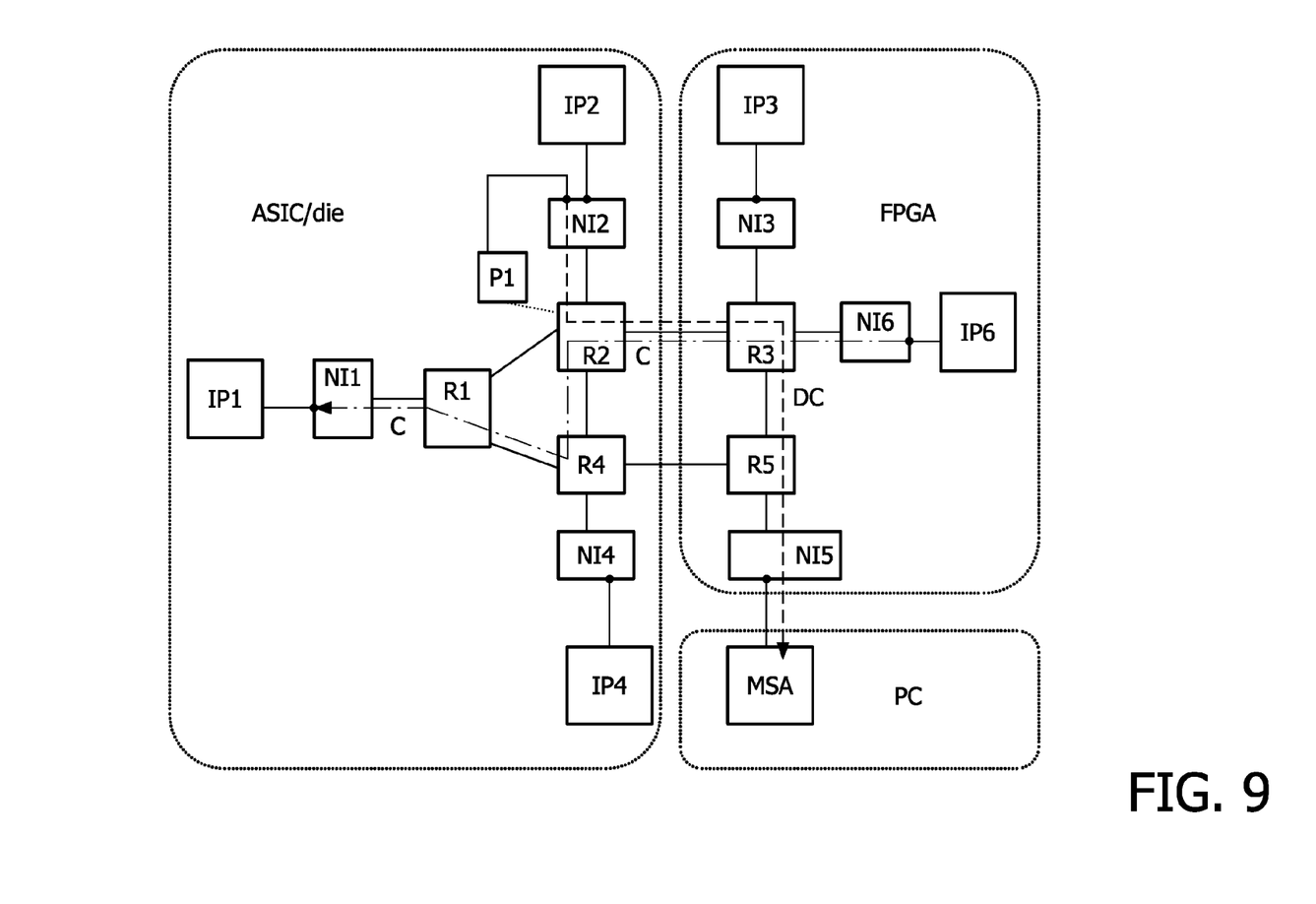
FIG. 9 shows a block diagram of a system on chip according to an eighth embodiment.

FIG. 9 shows a block diagram of a system according to an eighth embodiment. The components of system according to the ninth embodiment substantially corresponds the components of the system on chip according to FIG. 1. However, part of the components (IP1-IP2, NI1, NI2, NI4, R1, R2, R4) are arranged on an ASIC die, while other parts (IP3, IP6, NI3, NI6, NI5, R3, R5) are arranged on a FPGA or a personal computer PC, i.e. the monitoring service access point MSA. Although the components of the system are distributed other several independent parts, the overall operation is not changed as compared to the first, second or third embodiment.

The principles of the invention are relevant in any network on chip, or networks spanning multiple/single die/chip. The advantages of the invention is that only a small number (potentially one) of sophisticated probes are to be used in a network on chip based system on chip. Raw or preprocessed data can be forwarded to this potentially spatially-distant, complex, area expensive probe by other simpler, small area, spatially distributed monitors. Furthermore, an area efficient monitoring is achieved. Optionally network interfaces NIs attached to the monitors may be removed (which is assumed in all prior work).

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. An electronic device, comprising:
   a plurality of processing units,
   a network-based interconnect coupling the processing units for enabling at least one first communication path between the processing units,
   at least one first monitoring unit for monitoring a data traffic of the at least one first communication path and for outputting monitoring results via at least one second communication path, and
   at least one second monitoring unit for monitoring a data traffic of the at least one second communication path and for outputting monitoring results via at least one third communication path.

2. The electronic device according to claim 1, wherein the at least one first monitoring unit comprises at least one filter unit for filtering the data traffic of the at least one first communication path, and/or wherein the at least one second monitoring unit comprises at least one filter unit for filtering the data traffic of the at least one second communication path.

3. The electronic device according to claim 1, further comprising a sink unit for deleting data of the at least one second and/or third communication path.

4. The electronic device according to claim 3, further comprising:
   a network interface associated to at least one of the plurality of processing units,
   wherein the network-based interconnect comprises a plurality of routers,
   wherein the sink unit is embodied in the network interface, in a processing unit, as an independent processing unit and/or on a link between two routers or a link between a router and a network interface.

5. The electronic device according to claim 3, wherein flow control data is provided along the at least one second communication path in an opposite direction of the data traffic of the at least one first communication path, and the sink unit is adapted to provide flow control data for the deleted data of the at least one first, second and/or third communication path.

6. A system on chip, comprising:
   a plurality of processing units,
   a network-based interconnect coupling the processing units for enabling at least one first communication path between the processing units,
   at least one first monitoring unit for monitoring a data traffic of the at least one first communication path and for outputting monitoring results via at least one second communication path, and
   at least one second monitoring unit for monitoring a data traffic of the at least one second communication path and for outputting monitoring results via at least one third communication path.

7. The system on chip according to claim 6, wherein the at least one first monitoring unit comprises at least one filter unit for filtering the data traffic of the at least one first communication path, and/or wherein the at least one second monitoring unit comprises at least one filter unit for filtering the data traffic of the at least one second communication path.

8. The system on chip according to claim 6, further comprising a sink unit for deleting data of the at least one second and/or third communication path.

9. The system on chip according to claim 8, further comprising:
- a network interface associated to at least one of the plurality of processing units,
- wherein the network-based interconnect comprises a plurality of routers,
- wherein the sink unit is embodied in the network interface, in a processing unit, as an independent processing unit and/or on a link between two routers or a link between a router and a network interface.

10. The system on chip according to claim 8, wherein flow control data is provided along the at least one second communication path in an opposite direction of the data traffic of the at least one first communication path, and the sink unit is adapted to provide flow control data for the deleted data of the at least one first, second and/or third communication path.

11. A method for monitoring data traffic in an electronic device having a plurality of processing units, and a network-based interconnect coupling the processing units for enabling at least one first communication path between the processing units, comprising the steps of:
- monitoring a data traffic of the at least one first communication path using at least one first monitoring unit;
- outputting monitoring results via at least one second communication path using the at least one first monitoring unit;
- monitoring a data traffic of the at least one second communication path using at least one second monitoring unit; and
- outputting monitoring results via at least one third communication path using the at least one second monitoring unit.

12. The method of claim 11, wherein the at least one first monitoring unit comprises at least one filter unit for filtering the data traffic of the at least one first communication path, and/or wherein the at least one second monitoring unit comprises at least one filter unit for filtering the data traffic of the at least one second communication path.

13. The method of claim 11 further comprising deleting data of the at least one second and/or third communication path.

14. The method of claim 13, wherein the electronic device further comprises:
- a network interface associated to at least one of the plurality of processing units,
- wherein the network-based interconnect comprises a plurality of routers,
- wherein the sink unit is embodied in the network interface, in a processing unit, as an independent processing unit and/or on a link between two routers or a link between a router and a network interface.

15. The method of claim 13, wherein flow control data is provided along the at least one second communication path in an opposite direction of the data traffic of the at least one first communication path, and wherein the method further comprises providing flow control data for the deleted data of the at least one first, second and/or third communication path.

* * * * *